US010739866B2

(12) United States Patent
Bostick et al.

(10) Patent No.: US 10,739,866 B2
(45) Date of Patent: Aug. 11, 2020

(54) USING A WEARABLE DEVICE TO CONTROL CHARACTERISTICS OF A DIGITAL PEN

(71) Applicant: INTERNATIONAL BUSINESS MACHINES CORPORATION, Armonk, NY (US)

(72) Inventors: James E. Bostick, Cedar Park, TX (US); John M. Ganci, Jr., Raleigh, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/537,050

(22) Filed: Aug. 9, 2019

(65) Prior Publication Data

US 2019/0361536 A1    Nov. 28, 2019

Related U.S. Application Data

(63) Continuation of application No. 15/604,869, filed on May 25, 2017, now Pat. No. 10,423,236.

(51) Int. Cl.
*G06F 3/01* (2006.01)
*G06F 3/0354* (2013.01)
(Continued)

(52) U.S. Cl.
CPC .............. *G06F 3/017* (2013.01); *G06F 3/014* (2013.01); *G06F 3/038* (2013.01); *G06F 3/0346* (2013.01);
(Continued)

(58) Field of Classification Search
CPC ...... G06F 3/017; G06F 3/038; G06F 3/04847; G06F 3/04845; G06F 3/014;
(Continued)

(56) References Cited

U.S. PATENT DOCUMENTS 8,983,539 B1 *    3/2015    Kim ..................... G06F 3/1454
455/557
2008/0174547 A1    7/2008    Kanevsky
(Continued)

FOREIGN PATENT DOCUMENTS

WO        2015160193 A1    10/2015

OTHER PUBLICATIONS

"Apple Pencil", Wikipedia, https://en.wikipedia.or/wiki/Apple_Pencil, last printed Mar. 21, 2017, pp. 1-3.
(Continued)

*Primary Examiner* — Premal R Patel
(74) *Attorney, Agent, or Firm* — Brian Restauro; Andrew D. Wright; Roberts Calderon Safran & Cole, P.C.

(57) ABSTRACT

A method, system and computer program product for controlling a digital stylus are disclosed. In an embodiment, the method comprises receiving an indication that a digital stylus will be used in connection with a computing device, receiving an indication from a wearable device how the digital stylus should be used on the computing device, and executing the indication from the wearable device on the computing device. In an embodiment, the receiving an indication from a wearable device includes receiving an indication from the wearable device for determining specified characteristics of the digital stylus, and the executing the indication from the wearable device includes executing the specified characteristics of the digital stylus on the computing device. In an embodiment, the executing the indication from the wearable device includes executing the indication from the wearable device in different ways depending on a defined context of the digital stylus.

14 Claims, 5 Drawing Sheets

INPUT FROM DIGITAL PEN HELD ONE HAND IS EXTENDED WITH INPUT FROM SMART WATCH / ACTIVITY TRACKER MOUNTED ON OTHER HAND (51) Int. Cl.
*G06F 3/0346* (2013.01)
*G06F 3/038* (2013.01)
*G06F 3/0484* (2013.01)
*G06F 1/16* (2006.01)

(52) U.S. Cl.
CPC ...... *G06F 3/03545* (2013.01); *G06F 3/04845* (2013.01); *G06F 3/04847* (2013.01); *G06F 1/163* (2013.01); *G06F 2203/0381* (2013.01)

(58) Field of Classification Search
CPC .............. G06F 3/0346; G06F 3/03545; G06F 2203/0381; G06F 1/163
See application file for complete search history.

(56) References Cited

U.S. PATENT DOCUMENTS

| | | |
|---|---|---|
| 2014/0045547 A1 | 2/2014 | Singamsetty |
| 2014/0055426 A1 | 2/2014 | Park |
| 2014/0253462 A1 | 9/2014 | Hicks |
| 2014/0337748 A1* | 11/2014 | Lee ................. G06F 3/1454 715/740 |
| 2015/0081930 A1 | 3/2015 | Yu |
| 2015/0205387 A1 | 7/2015 | Osterhout |
| 2015/0334189 A1 | 11/2015 | Hwang |
| 2016/0105924 A1* | 4/2016 | Baek ................. H04M 1/6066 |
| 2016/0202733 A1 | 7/2016 | Ho |
| 2016/0224065 A1 | 8/2016 | Weldon |
| 2016/0320870 A1 | 11/2016 | Bell |
| 2017/0090665 A1 | 3/2017 | Pollmann |
| 2017/0193303 A1 | 7/2017 | Wexler et al. |

OTHER PUBLICATIONS

"Digital pen", Wikipedia, https://en.wikipedia.or/wiki/Digital_pen, last printed Mar. 21, 2017, pp. 1-3.

"Stylus (computing)", Wikipedia, https://en.wikipedia.or/wiki/Stylus_%28computing%29, last printed Mar. 21, 2017, pp. 1-2.

Choo et al., "Enabling multi-device interaction on the go in the MAGI project", 2016 ACM Conference on Human Factors in Computing Systems (CHI), CHI 2016 Workshop on Interacting with Multi-Device ecologies "In the wild", San Jose, CA, May 7-12, 2016.

Liu et al., "uWave: Accelerometer-based Personalized Gesture Recognition and Its Applications", in Pervasive and Mobile Computing, Dec. 2009, pp. 1-9.

Thalmic Labs, Makers of the Myo Gesture Control Armband, https:www.thalmic.com, last printed May 3, 2017, pp. 1-4.

"List of IBM Patents or Patent Applications Treated as Related" 1 page, dated Aug. 9, 2019.

* cited by examiner

USING A WEARABLE DEVICE TO CONTROL CHARACTERISTICS OF A DIGITAL PEN

BACKGROUND

Various pen-shaped apparatus or styli have been designed and developed as inputting tools for use with portable electronic devices such as tablets, smart phones, personal digital assistants, or in general any computer with a touch-sensitive screen. A conventional stylus is generally configured with a pen-shaped body for easy gripping by a user, and a tip for engaging the input screen of an electronic device so that the user can tap, handwrite, or draw on the input screen, usually with relatively higher precision and better control than using a finger of the user.

For example, digital pens and pencils, such as the Apple Pencil, work in combination with touch-screen devices such as tablets to create a precise input device that can act as a pencil, pen, or highlighter of any color. The characteristics of what a digital pen does are typically defined by user interface selections in a mobile app. For example, to use a digital pen as a red pen, the user must make menu selections in an app to indicate this. Then, to change the characteristics of the digital pen to act as a yellow highlighter, other menu options must be selected.

The procedures needed for the user to make the selections to change the characteristics or the use of the digital pen is cumbersome, time-consuming and inconvenient.

SUMMARY

Embodiments of the invention provide a method, system and computer program product for controlling a digital stylus. In an embodiment, the method comprises receiving an indication that a digital stylus will be used in connection with a computing device, receiving an indication from a wearable device how the digital stylus should be used on the computing device, and executing the indication from the wearable device on the computing device. In an embodiment, the receiving an indication from a wearable device includes receiving an indication from the wearable device for determining specified characteristics of the digital stylus, and the executing the indication from the wearable device includes executing the specified characteristics of the digital stylus on the computing device. In an embodiment, the executing the indication from the wearable device includes executing the indication from the wearable device in different ways depending on a defined context of the digital stylus.

Digital pens represent the next generation of mobile stylus. When combined with supported touch-screen devices such as tablets, digital pens provide a precise input method. In supported apps, a mobile pen can be used to sketch a picture, create a diagram, or take notes with a high degree of precision. Users can modify how the virtual pen mimics real life objects such as HB pencils, marker pens, highlighters and so forth, and also modify the color used.

Customization of how a mobile pen is used in a given app is typically determined by a user making a selection from a menu. For example, to change the pen type, a user can click on an icon of a pen, a pencil, or a marker. To change color, a user selects a color from a palette, and to erase content, a user clicks on an eraser icon or an undo button.

These customization options, where a user must select an option from a menu, take away from the simplicity of using a digital pen to create content. For example, to change from using red ink to blue ink, the user must bring up the appropriate menu, locate the color palette, and select blue, then dismiss the menu and continue drawing.

The rise of digital pens coincides with the rise of wearable devices such as smart watches and activity trackers. These wearable devices feature motion tracking technology and are often worn on the non-dominant arm of a user. This means a user may be holding a digital pen in one hand and have a wearable device on their other wrist. This presents the opportunity to use the movement data of the wearable device as an additional input device to influence how input from the digital pen is interpreted. By issuing a gesture on their wearable device, a user can change the characteristic of how a digital pen works. For instance, a red pen can become a yellow highlighter with the flick of a wrist. Embodiments of this invention use this dual-input device technology to create context-sensitive gestures for use with a digital pen.

Embodiments of the invention provide a method and system by which a user holds a digital pen in one hand, and wears a smart watch or activity tracker on the other wrist; and the digital pen and smart watch or activity tracker are paired with a touch-screen device such as a tablet. When a paired digital pen makes contact with a touch-screen device that is running a digital pen compatible app, movement tracking is initiated. The user issues gestures through movement of their smart watch or activity tracker and these movements are sent to the touch-screen device. The touch-screen device interprets these movements into context-sensitive gestures that influence how input from the digital pen is interpreted.

Embodiments of the invention process movements tracked from a smart watch or activity tracker to the movements of a digital pen on a touch-screen device to create context-sensitive gestures that influence how input from the digital pen is interpreted. These gestures can be customized by a user or manufacturer. Embodiments of the invention provide automated capture of wrist-based gestures from one hand based upon detecting use of a digital pen held in the other hand.

DETAILED DESCRIPTION

As discussed above, digital or electronic styli, such as digital pens and pencils, work in combination with touch-screen devices such as tablets to create a precise input device that can act as a pen, pencil, or highlighter of any color. The characteristics of what a digital pen does are typically defined by user interface selections in a mobile app. For example, to use a digital pen as a red pen, the user must make menu selections in an app to indicate this. Then, to change the characteristics of the digital pen to act as a yellow highlighter, other menu options must be selected.

The rise of digital pens coincides with the rise of wearable devices such as smart watches and activity trackers. These wearable devices feature motion tracking technology and are often worn on the non-dominant arm of a user. In accordance with embodiments of this invention, by issuing a gesture on their wearable device, a user can change the characteristic of how a digital pen works. Embodiments of this invention use this dual-input device technology to create context-sensitive gestures for use with a digital pen.

Embodiments of the invention provide a dual-input solution in which the user holds a digital pen in one hand and wears a smart watch or activity tracker on the other.

Digital pens are becoming more commonplace. Smart watches and activity trackers are also gaining in popularity. These smart watches and activity trackers contain motion sensing technology and are typically worn on a user's non-writing hand. So a user who uses both a digital pen and a smart watch will typically hold the digital pen in one hand and wear the smart watch on their other wrist.

Figure 1:
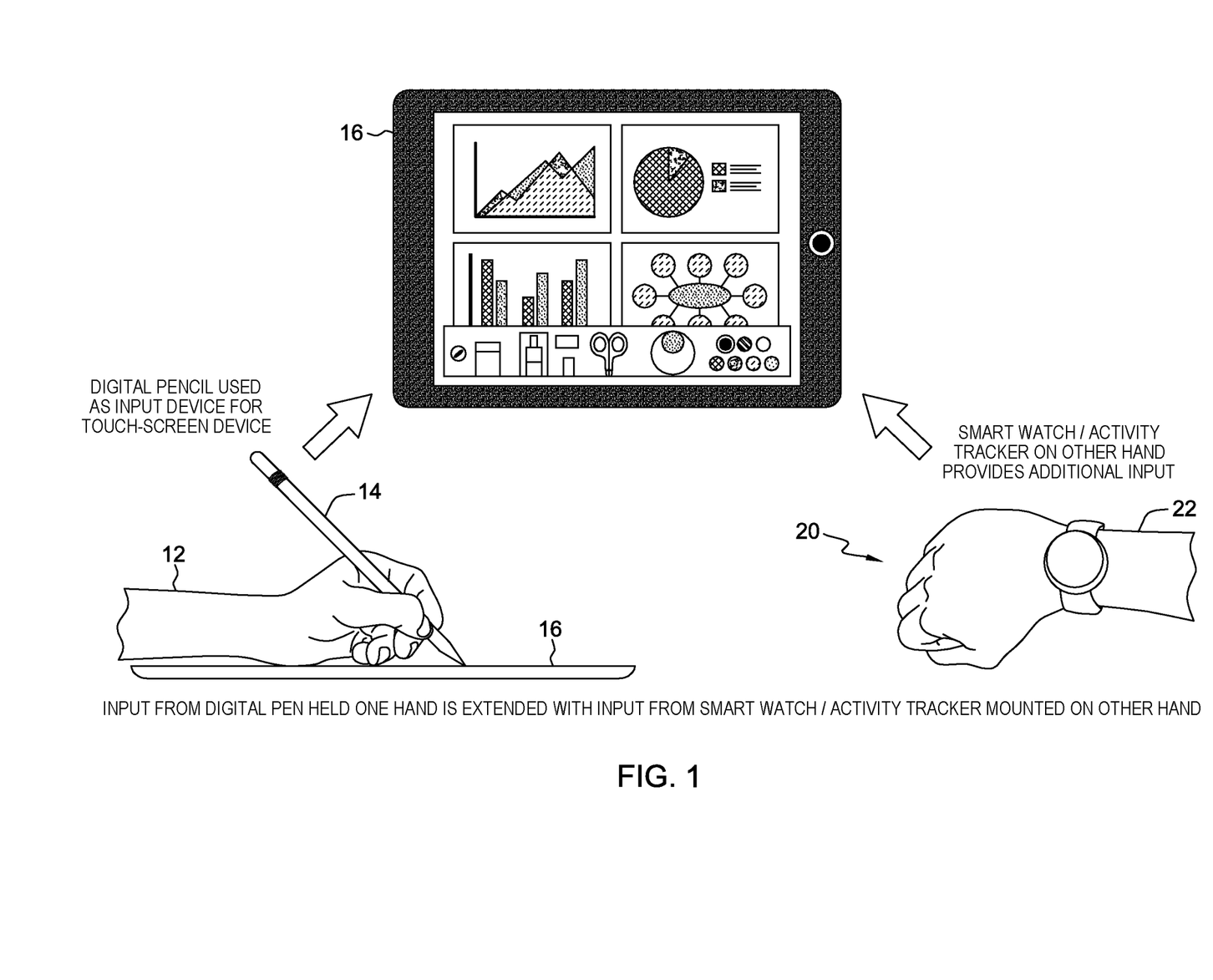
FIG. 1 illustrates input from a digital pen held in one hand being extended with input from a smart watch/activity tracker mounted on the other hand in accordance with an embodiment of the invention.

An embodiment of the invention is illustrated in FIG. 1. In this embodiment, a user 12 initiates dual-input tracking when the digital pen 14 makes contact with a paired touch-screen device 16; and with dual-input tracking initiated, the user can issue gestures 20 from their smart watch/activity tracker 22 that influence how input from the digital pen is interpreted.

Using this method, users can, as examples, change the color of the ink coming from a digital pen by raising or lowering their wrist, or rotate an object selected by the digital pen by rotating their wrist. This eliminates the need for a user to make menu selections to change the behavior of a digital pen. In embodiments of the invention, by removing the need to make user interface selections and instead use issued gestures, the user experience is greatly improved.

Figure 2:
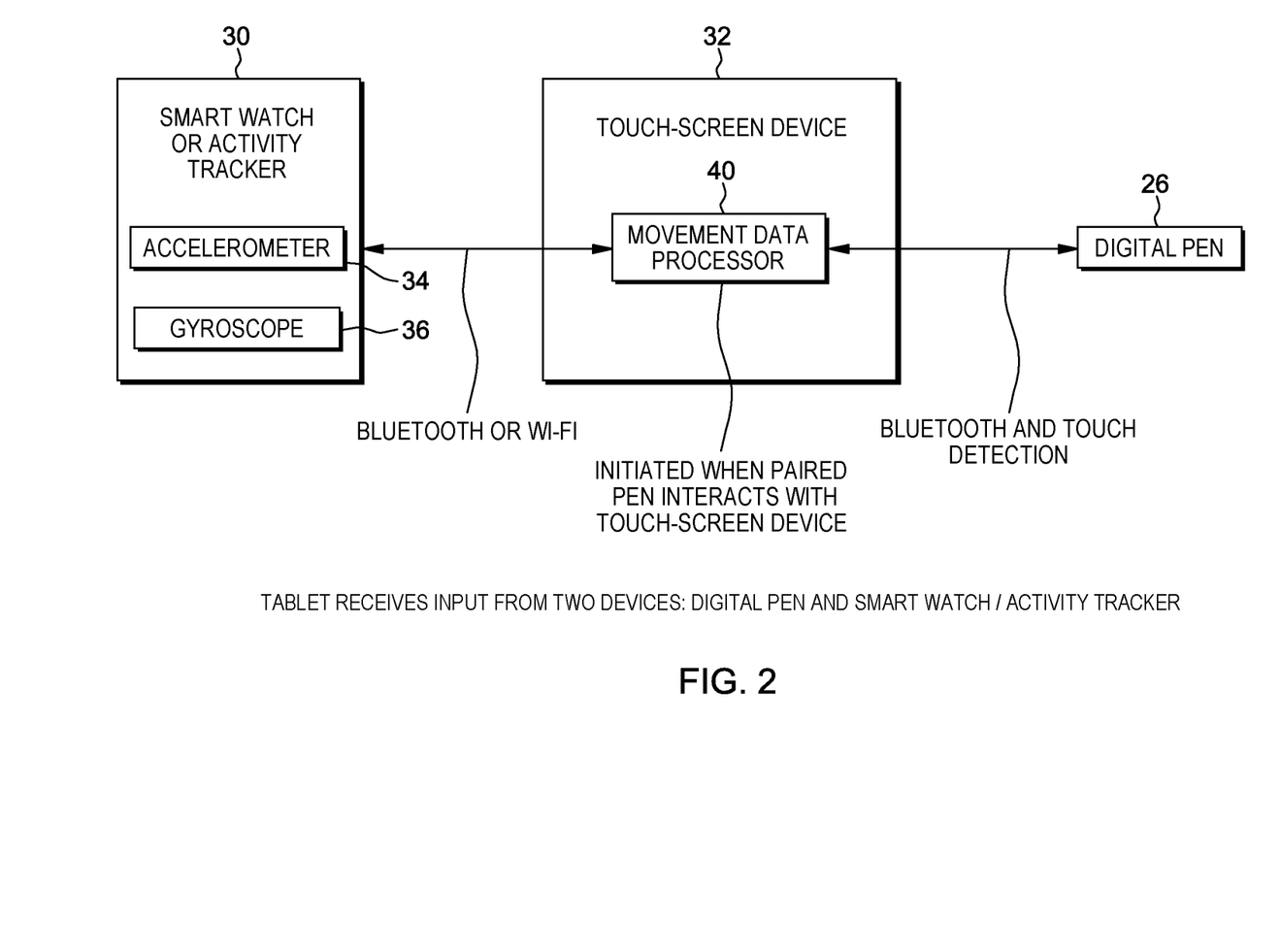
FIG. 2 is a schematic diagram showing, in an embodiment of the invention, a tablet receiving input from two devices: a digital pen, and a smart watch/activity tracker.

FIG. 2 shows components of an embodiment of the invention. Generally, FIG. 2 shows a digital pen 26, a smart watch/activity tracker 30, and touch screen device 32. The smart watch/activity tracker includes an accelerometer 34 and gyroscope 36, and the touch screen device includes a movement data processor 40.

Digital pen 26 is a stylus-type input device. Other stylus-type input devices, such as digital pencils may also be used in embodiments of the invention. Suitable stylus-type devices that may be used include, for example, the Apple Pencil or Galaxy Note Stylus Pen. The Smart watch/activity tracker 30 is a wrist worn device with movement sensors, such as a smart watch (for example Apple Watch or Samsung Gear) or fitness tracker (for example Fitbit Flex or Microsoft Band). The accelerometer 34 of the smart watch/activity tracker measures linear acceleration of the smart watch/activity tracker, and the gyroscope 36 of the smart watch/activity tracker measures the orientation of the smart watch/activity tracker. The touch-screen device 32 is a touch-screen input device such as a tablet, smart phone, or touch sensitive laptop screen. The movement data processor 40 of the touch screen device correlates movements from the digital pen with accelerometer and gyroscope data from the smart watch/activity tracker.

Pre-Configuration

In embodiments of the invention, pre-configuration steps are performed before using a dual-input device. In a configuration, the digital pen 26 is paired with the touch-screen device 32. This communication typically occurs over Bluetooth. Pairing the digital pen with the touch-screen device helps to ensures that the touch-screen device will recognize input from this digital pen. The smart watch or activity tracker 30 is also paired with the touch-screen device, enabling two way communication between the two devices. This communication also typically occurs over Bluetooth, although some devices such as the Apple Watch can also use a shared Wi-Fi connection. In addition, definitions of context-sensitive gestures are established (for example what should happen when the user is drawing a line and the wrist is raised up). These gestures and their meanings can be predefined by a manufacturer or can be user defined.

Stage 1: Initiating Dual-Input Tracking

With pre-configuration complete, the following sequence may be used to implement dual-input tracking. A user launches a digital pen compatible app on a touch-screen device. When the user first makes contact with the digital pen 26 on the touch-screen device 32, the movement data processor module 40 on the touch-screen device is triggered. The movement data processor sends a message to the smart watch/activity tracker requesting that movement data be captured. The smart watch/activity tracker captures movement using its onboard sensors such as the accelerometer 34 and the gyroscope 36.

This movement data are continually sent from the smart watch to the movement data processor module 40 on the touch-screen device. The movement data processor correlates this movement data with the movements of the digital pen 26 to recognize and implement gestures. When the digital pen has not made contact with the touch-screen device for a predefined period of time, or when the digital pen app is no longer running, the movement data processor sends a message to the smart watch/activity tracker requesting that movement data capture be turned off.

Stage 2: Dual-Input Context Sensitive Gesture Recognition

With dual-input tracking initiated, a user can issue gestures from their smart watch/activity tracker 30 that influence how input from the digital pen 26 is interpreted. The movement data processor component 40 running on the touch-screen device 32 compares inputs from both the digital pen input and the smart watch/activity tracker movement data to detect context sensitive gestures. These gestures are context sensitive because the same movement gesture issued on the smart watch/activity tracker may change the digital pen, or operation of the digital pen, in different ways depending on how the pen is being used.

Figure 3:
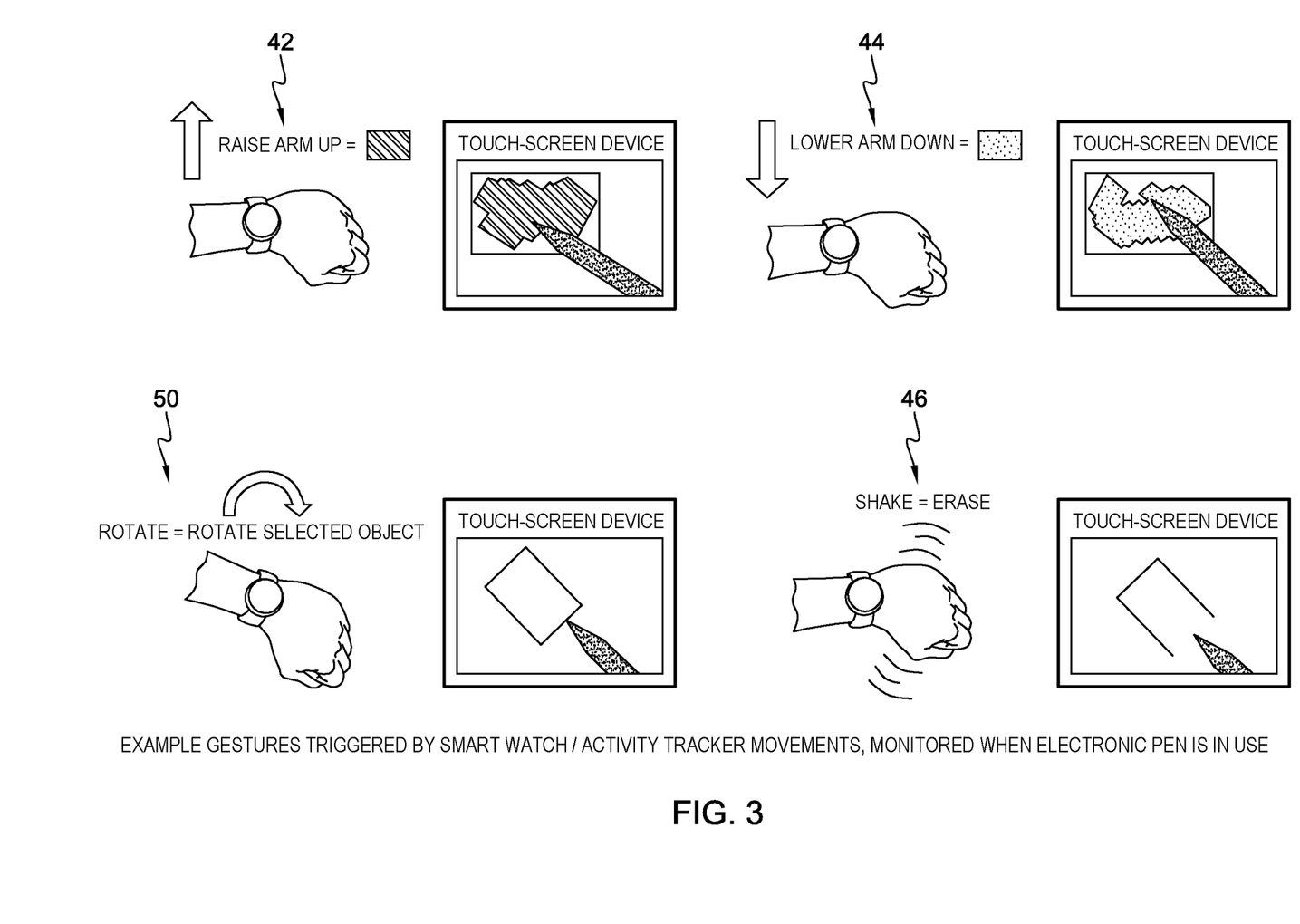
FIG. 3 show example gestures triggered by movements of a smart watch/activity tracker monitored when an electronic pen is in use, in an embodiment of the invention.

FIG. 3 illustrates examples of gestures from a smart watch/activity tracker used, in embodiments of the invention, as an additional input device to manipulate how a digital pen interacts with a tablet device.

Examples of context sensitive gesture recognition may include binary movement, analog movement, and other movement. Binary movements are movements that are interpreted in a binary way. As an example, when a user raises or lowers their wrist on which the smart watch/activity tracker is worn, a binary selection is applied to the digital pen. For example, when shading an object, UP movement of the wrist, as shown at 42, can mean use red shading, DOWN movement of the wrist, as shown at 44, can mean use blue shading, movement of the wrist to the LEFT can mean use green shading, and movement of the wrist to the RIGHT can mean use yellow shading. In another context, the same gesture can mean different things. For example, when drawing a line, raising a wrist UP can mean to use an HB pencil, and lowering a wrist DOWN can mean to use a thick marker pen.

Analog movements are movements that are interpreted in an analog manner. More granular selections can be made by measuring, for instance, the velocities of gestures. For example, the faster the user raises their wrist, the thicker a line is drawn by the digital pen, or the deeper a selected color is painted. Other movements may also be used. Movements such as a shake of the wrist, as shown at 46, can indicate an erase action (erase the last object drawn by the digital pen), and rotating of a wrist, as shown at 48, can indicate rotate an object selected by a digital pen.

Figure 4:
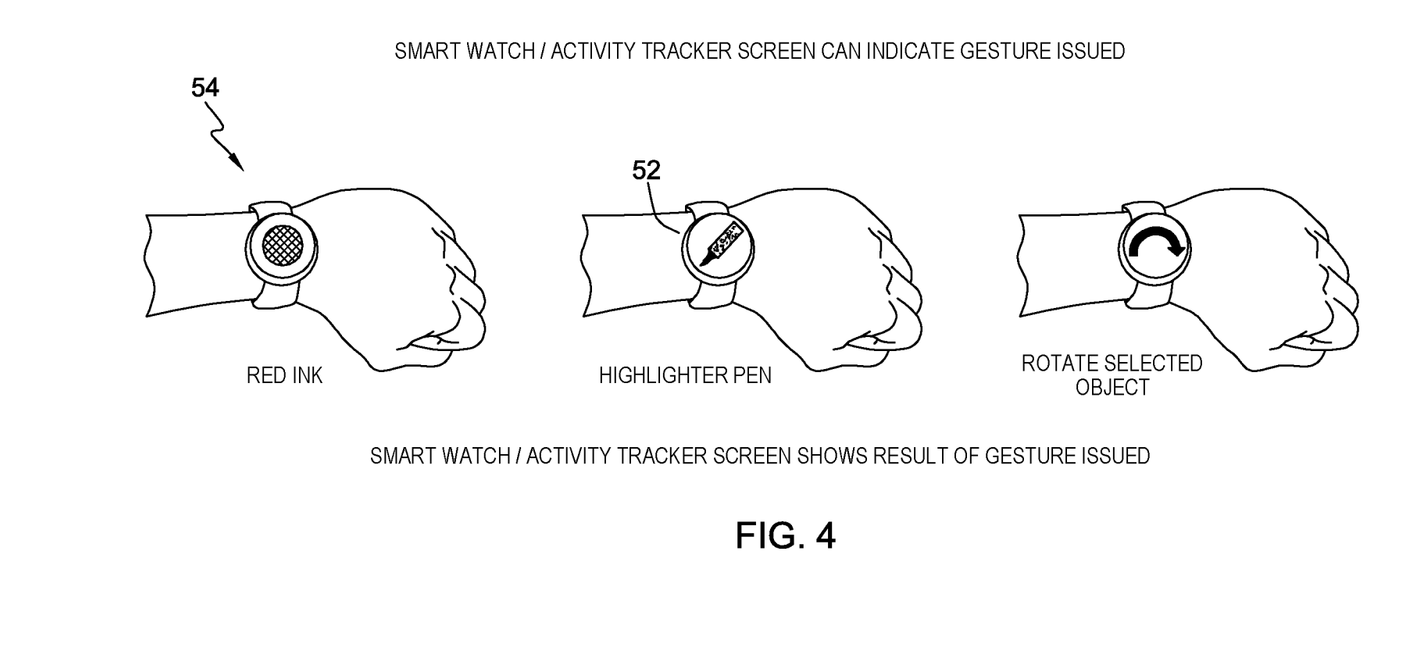
FIG. 4 illustrates the use of the smart watch/activity tracker to confirm a change made to the way a digital pen is used.

As shown in FIG. 4, the screen 52 of the smart watch/activity tracker can be used to confirm the gesture that has been issued. For example, as shown at 54, if the user issues a gesture to change the color of ink to red, the smart watch screen can show this color change.

Figure 5:
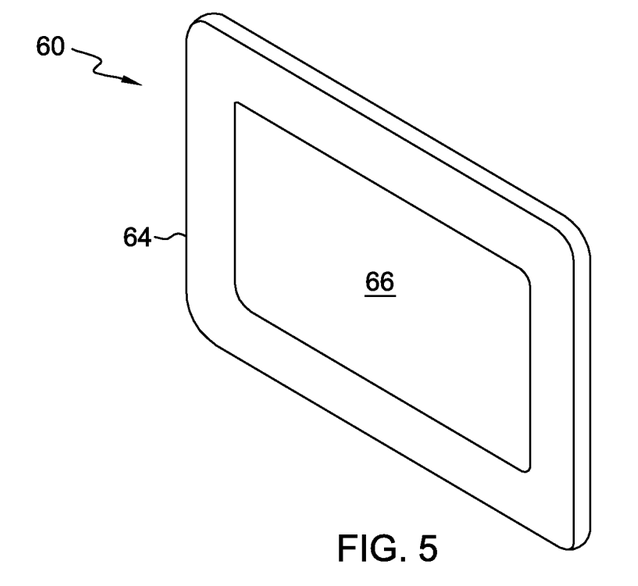
FIG. 5 shows a computing device having a touch-sensitive screen that may be used in embodiments of the invention.
Figure 6:
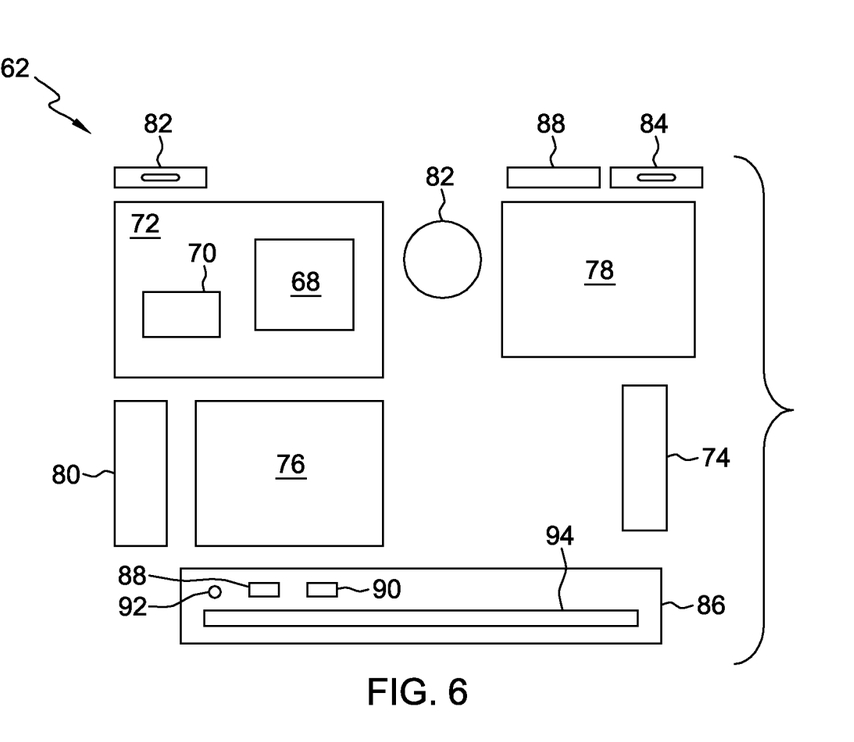
FIG. 6 shows architecture for a processing system for the computing device of FIG. 5.

FIG. 5 illustrates a tablet computer 60 that may be used in embodiments of the invention, and FIG. 6 shows an architecture for an processing system 62 for the tablet computer. With reference to FIG. 5, the tablet computer generally comprises a main body 64 and a display 66. Architecture 62 comprises a processor 68 such as a CPU and a memory 70 such as RAM, which may be provided on a motherboard 72. The embodiment of the architecture shown in FIG. 6 further include a touch board 74 for detecting and processing touch input to the display screen, a storage device 76, such as a solid state or hard disk, a battery 78, an I/O board 80 for providing I/O interfaces and for handling communication of signals to the processor or motherboard 72, a fan 82, speakers 84, keyboard 86 and an antenna 88 for wireless communications. The antenna 88 may be accompanied by circuitry for handing wifi communications, and/or cellular type communications.

Processor 68 runs a suitable Operating System (e.g., Android OS, iOS, Windows Mobile OS, etc.). The touch board 74 is operable to detect positional input made by a human operator using a pen and/or a finger, and to output a positional input signal indicative of a position pointed to by the operator. A positional input sensor may be a pen sensor configured to detect a position of a pen (stylus) relative to a sensor surface, or a touch sensor configured to detect a position of a finger relative to a sensor surface, or a combination of a pen sensor and a touch sensor. Various pen sensors are known such as those based on electromagnetic coupling between an X-Y matrix of line electrodes arranged on a sensor surface and a resonant circuit provided in a pen. Various touch sensors are known such as a capacitive type sensor configured to detect a finger touch at an intersection between an X electrode and a Y electrode in an X-Y sensor matrix as a change in capacitance between the X and Y electrodes.

The display 66 of tablet computer 60 is operable to receive and display a video signal. The display may be an LCD (Liquid Crystal Display), organic EL (Electro Luminescence) display, or any other suitable display or screen that can be used with the positional input sensor 74.

In the embodiment shown in FIGS. 5 and 6, the positional input signal from the sensor 74 is sent to the tablet processor 68, and the tablet processor sends a video signal to the display 66. The tablet processor 68 is coupled to a memory storing programs for running a tablet Operating System and executing any software loaded to the memory. The tablet processor 68 receives the positional input signal for the tablet Operating System and the software and outputs a video signal of the tablet OS and the software to the display 66.

The keyboard 86 may have I/O ports such as a USB port 88 and a LAN port 90 and may have a power input 92 for connection to an external power source. These keyboard I/O ports and the power input may be connected by cable, wires or other suitable connections to other components of the tablet computer such as motherboard 72. Also, the keyboard may have a keyboard circuit 94 for sensing key presses and/or for converting key presses to signals that may be communicated to the motherboard and processor.

Those of ordinary skill in the art will appreciate that the architecture and hardware depicted in FIG. 6 may vary.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A computer-implemented method comprising:
receiving, by a computing device, movement data from a wearable device worn by a user indicating that the user is making a gesture;
determining, by the computing device, a predetermined digital stylus characteristic based on the gesture;
changing, by the computing device, a first behavior of a digital stylus in communication with the computing device to a second behavior based on the predetermined digital stylus characteristic;
determining, by the computing device, that the digital stylus will be used in connection with the computing device; and
initiating, by the computing device, a dual-input tracking mode wherein the computing device captures the movement data of the wearable device and the movement data is associated with the digital stylus.

2. The computer-implemented method of claim 1, wherein the determining that the digital stylus will be used in connection with the computing device is based on a determination that the digital stylus has contacted a touch-screen of the computing device.

3. The computer-implemented method of claim 1, further comprising ending, by the computing device, the dual-input tracking mode wherein the computing device does not capture the movement data of the wearable device, based on a determination that the digital stylus has not contacted the touch-screen for a predetermined period of time.

4. The computer-implemented method of claim 1, further comprising initiating, by the computing device, a display of the second behavior on a screen of the wearable device.

5. The computer-implemented method of claim 1, further comprising sending, by the computing device, a request to the wearable device for the movement data, wherein the request causes the wearable device to send the movement data to the computing device.

6. The computer-implemented method according to claim 1, further comprising translating, by the computing device, the movement data into instructions for how the digital stylus is to be used with respect to the computing device.

7. A computer program product comprising a computer readable storage medium having program instructions embodied therewith, the program instructions executable by a computing device to cause the computing device to:
receive movement data from a wearable device worn by a user indicating that the user is making a gesture;

determine a predetermined digital stylus characteristic based on the gesture;

change a first behavior of a digital stylus in communication with the computing device to a second behavior based on the predetermined digital stylus characteristic;

determine that the digital stylus will be used in connection with the computing device; and initiate a dual-input tracking mode wherein the computing device captures the movement data of the wearable device, and the data is associated with the digital stylus.

8. The computer program product of claim 7, wherein the determining that the digital stylus will be used in connection with the computing device is based on a determination that the digital stylus has contacted a touch-screen of the computing device.

9. The computer program product of claim 7, wherein the program instructions further cause the computing device to end the dual-input tracking mode wherein the computing device does not capture the movement data of the wearable device, based on a determination that the digital stylus has not contacted the touch-screen for a predetermined period of time.

10. The computer program product of claim 7, wherein the program instructions further cause the computing device to initiate a display of the second behavior on a screen of the wearable device.

11. The computer program product of claim 7, wherein the program instructions further cause the computing device to send a request to the wearable device for the movement data, wherein the request causes the wearable device to send the movement data to the computing device.

12. The computer program product of claim 7, wherein the program instructions further cause the computing device to translate the movement data into instructions for how the digital stylus is to be used with respect to the computing device.

13. A system comprising:

a processor, a computer readable memory and a computer readable storage medium associated with a computing device;

program instructions to receive movement data from a wearable device worn by a user indicating that the user is making a gesture;

program instructions to determine a predetermined digital stylus characteristic based on the gesture;

program instructions to change a first behavior of a digital stylus in communication with the computing device to a second behavior based on the predetermined digital stylus characteristic;

program instructions to determine that the digital stylus will be used in connection with the computing device;

program instructions to initiate a dual-input tracking mode wherein the computing device captures the movement data of the wearable device, and the data is associated with the digital stylus; and program instructions to end the dual-input tracking mode wherein the computing device does not capture the movement data of the wearable device, based on a determination that the digital stylus has not contacted the touch-screen for a predetermined period of time, wherein the program instructions are stored on the computer readable storage medium for execution by the processor via the computer readable memory.

14. The system of claim 13, further comprising program instructions to initiate a display of the second behavior on a screen of the wearable device.

* * * * *